(12) United States Patent
Hidley (10) Patent No.: US 11,326,730 B2
(45) Date of Patent: May 10, 2022

(54) SUPPORT ASSEMBLY

(71) Applicant: Kongsberg Actuation Systems II, Inc., Suffield, CT (US)

(72) Inventor: Scott Hidley, Broad Brook, CT (US)

(73) Assignee: Kongsberg Actuation Systems II, Inc., Suffield, CT (US)

( * ) Notice: Subject to any disclaimer, the term of this patent is extended or adjusted under 35 U.S.C. 154(b) by 449 days.

(21) Appl. No.: 16/318,524

(22) PCT Filed: Jul. 25, 2016

(86) PCT No.: PCT/US2016/043847
§ 371 (c)(1),
(2) Date: Jan. 17, 2019

(87) PCT Pub. No.: WO2018/021995
PCT Pub. Date: Feb. 1, 2018

(65) Prior Publication Data
US 2019/0316720 A1 Oct. 17, 2019

(51) Int. Cl.
*F16L 41/08* (2006.01)
*F16L 47/24* (2006.01)

(52) U.S. Cl.
CPC ............ *F16L 41/086* (2013.01); *F16L 47/24* (2013.01)

(58) Field of Classification Search
CPC ................................ F16L 41/086; F16L 47/24
See application file for complete search history.

(56) References Cited

U.S. PATENT DOCUMENTS

| 4,905,766 A * | 3/1990 | Dietz | F16L 47/24 169/37 |
| 4,933,079 A * | 6/1990 | Kroha | B01D 29/90 210/232 |

(Continued)

FOREIGN PATENT DOCUMENTS

| DE | 19503346 A1 | 8/1996 |
| DE | 102011010905 A1 | 8/2012 |

(Continued)

OTHER PUBLICATIONS

International Search Report for Application No. PCT/US2016/043847 dated May 4, 2017, 3 pages.

(Continued)

*Primary Examiner* — James M Hewitt, II
(74) *Attorney, Agent, or Firm* — Howard & Howard Attorneys PLLC (57) ABSTRACT

A support assembly comprises a mounting bracket and a coupling component. The mounting bracket comprises a first material and has an engagement surface defining a void along a first axis. The coupling component comprises a second material, which is different than the first material. The coupling component has a first end, a second end, and an intermediate portion. The intermediate portion extends through, and partially fills, the void defined by the mounting bracket. The intermediate portion defines a fluid passageway about the first axis within the void and also presents a locking surface. The locking surface abuts the engagement surface to prevent rotation of the coupling component with respect to the mounting bracket.

17 Claims, 10 Drawing Sheets

(56) References Cited

U.S. PATENT DOCUMENTS

| | | | |
|---|---|---|---|
| 5,622,392 A * | 4/1997 | Gochenouer | F16L 3/22 285/124.1 |
| 5,772,103 A | 6/1998 | Hofius, Sr. et al. | |
| 5,810,400 A * | 9/1998 | Youngs | F16L 5/06 285/139.1 |
| 5,957,415 A | 9/1999 | Perea | |
| 6,019,348 A | 2/2000 | Powell | |
| 6,199,916 B1 | 3/2001 | Klinger et al. | |
| 6,485,240 B2 | 11/2002 | Stumpf et al. | |
| 6,832,785 B1 | 12/2004 | Zitkovic, Jr. | |
| 6,957,761 B2 | 10/2005 | Staheli et al. | |
| 7,279,055 B2 | 10/2007 | Schuler | |
| 7,388,048 B2 | 6/2008 | Blondel et al. | |
| 7,625,972 B2 | 12/2009 | Blondel et al. | |
| 7,686,348 B2 | 3/2010 | Hatass et al. | |
| 7,731,245 B2 | 6/2010 | Kerin et al. | |
| 7,758,086 B2 | 7/2010 | Slunick et al. | |
| 8,087,425 B2 | 1/2012 | Railsback | |
| 8,109,688 B2 | 2/2012 | Hattass et al. | |
| 8,297,048 B2 | 10/2012 | Biedler et al. | |
| 8,561,875 B2 | 10/2013 | Hattass et al. | |
| 8,999,086 B2 | 4/2015 | Bollmann et al. | |
| 9,346,215 B2 | 5/2016 | Hattass et al. | |
| 9,482,376 B2 | 11/2016 | Eckardt et al. | |
| 2003/0211265 A1 | 11/2003 | Balbaugh et al. | |
| 2010/0126303 A1 * | 5/2010 | Mai | F16L 41/086 74/606 A |
| 2013/0264816 A1 | 10/2013 | Cichorek et al. | |

FOREIGN PATENT DOCUMENTS

| | | |
|---|---|---|
| DE | 102013223037 A1 | 5/2015 |
| DE | 102014004158 A1 | 9/2015 |
| EP | 3617217 B1 | 2/1996 |
| EP | 1136231 A2 | 9/2001 |
| EP | 1503128 A2 | 2/2005 |
| EP | 1577076 A2 | 9/2005 |
| EP | 1604805 A1 | 12/2005 |
| EP | 1637792 A2 | 3/2006 |
| EP | 1640141 A2 | 3/2006 |
| EP | 1909016 A2 | 4/2008 |
| EP | 1920904 A1 | 5/2008 |
| EP | 2444707 A1 | 4/2012 |
| FR | 2750194 A1 | 12/1997 |
| WO | 9857092 A1 | 12/1998 |
| WO | 9945071 A1 | 9/1999 |
| WO | 0214052 A1 | 2/2002 |
| WO | 2003018296 A1 | 3/2003 |
| WO | 2004091840 A2 | 10/2004 |
| WO | 2007137553 A2 | 12/2007 |
| WO | 2008007230 A2 | 1/2008 |
| WO | 2009133265 A2 | 11/2009 |
| WO | 2014017907 A2 | 1/2014 |

OTHER PUBLICATIONS

English language abstract for DE 195 03 346 A1 extracted from espacenet.com database on Jul. 18, 2019, 1 page.

English language abstract for DE 10 2011 010 905 A1 extracted from espacenet.com database on Jul. 18, 2019, 1 page.

Computer-generated English language abstract for DE 10 2013 223 037 A1 extracted from espacenet.com database on Jul. 18, 2019, 2 pages.

Computer-generated English language abstract for DE 10 2014 004 158 A1 extracted from espacenet.com database on Jul. 18, 2019, 3 pages.

English language abstract for EP 0 617 217 B1 extracted from espacenet.com database on Jul. 18, 2019, 2 pages.

English language abstract for EP 1 136 231 A1 extracted from espacenet.com database on Jul. 18, 2019, 1 page.

English language abstract for EP 1 577 076 A2 extracted from espacenet.com database on Jul. 18, 2019, 2 pages.

English language abstract for EP 1 604 805 A1 extracted from espacenet.com database on Jul. 18, 2019, 1 page.

English language abstract for EP 1 637 792 A2 extracted from espacenet.com database on Jul. 18, 2019, 1 page.

English language abstract for EP 1 640 141 A2 extracted from espacenet.com database on Jul. 18, 2019, 1 page.

English language abstract for EP 2 183 320 A1 extracted from espacenet.com database on Jul. 18, 2019, 3 pages.

English language abstract for EP 2 444 707 A1 extracted from espacenet.com database on Jul. 18, 2019, 2 pages.

English language abstract for FR 2 750 194 A1 extracted from espacenet.com database on Jul. 18, 2019, 1 page.

English language abstract for WO 2007/137553 A2 extracted from espacenet.com database on Jul. 18, 2019, 2 pages.

English language abstract for WO 02/14052 A1 extracted from espacenet.com database on Oct. 4, 2021, 2 pages.

English language abstract for WO 2009/133265 A2 extracted from espacenet.com database on Oct. 4, 2021, 2 pages.

* cited by examiner

SUPPORT ASSEMBLY

CROSS REFERENCE TO RELATED APPLICATIONS

The subject application is the National Stage of International Patent Application No. PCT/US2016/043847, filed on Jul. 25, 2016, which is expressly incorporated herein by reference in its entirety.

BACKGROUND OF THE INVENTION AND METHOD OF MAKING SAME

1. Field of the Disclosure

The subject invention generally relates to a support assembly for mounting coupling components and a method of forming the support assembly.

2. Description of Related Art

Support assemblies for mounting coupling components can be used in applications throughout various industries. Typically, the support assemblies include two components, a mounting bracket and a coupling component. The mounting bracket secures the support assembly within the application. The coupling component couples two or more conduits together. These types of support assemblies can be used to secure coupling components for fluid systems that convey fluids such as fuel, coolant, motor oil, hydraulic fluid, and transmission fluid. For example, the support assembly can be used to secure a coupling component in an engine compartment of a vehicle.

Various mounting bracket designs are available. The design of the mounting bracket allows for efficient positioning and mounting of the coupling component relative to other components, and protects the conduits from mechanical damage, including damage incurred while mounting the support assembly. Current designs may include: bolted metal brackets and elastomeric bushings, elastomeric coated or uncoated metal or plastic clips, integrally molded thermoplastic materials, and/or metal brackets welded to metal conduits which are then crimped onto hose ends using stems secured to the tubing and/or ferrules.

In some current designs, there can be manufacture and/or performance issues. As such, there remains an opportunity to provide an improved support assembly that can be efficiently mounted and is durable.

SUMMARY OF THE INVENTION

A support assembly is disclosed. The support assembly comprises a mounting bracket, and a coupling component. The mounting bracket comprises a first material and has an engagement surface defining a void along a first axis. The coupling component comprises a second material that is different than the first material. The coupling component has a first end, a second end, and an intermediate portion. The intermediate portion extends through, and partially fills the void defined by the mounting bracket. The intermediate portion defines a fluid passage about the first axis within the void and also presents a locking surface. The locking surface abuts the engagement surface to prevent rotation of the coupling component with respect to the mounting bracket.

A method of forming the support assembly is also disclosed. The method comprises the steps of forming a mounting bracket and overmolding a coupling component to the mounting bracket.

The support assembly is easy to mount, durable, and prevents the rotation of the coupling component with relation to the mounting bracket. Further, the method of forming the support assembly is efficient.

BRIEF DESCRIPTION OF THE DRAWINGS

Advantages of the subject invention will be readily appreciated as the same becomes better understood by reference to the following description when considered in connection with the accompanying drawings.

DETAILED DESCRIPTION OF THE INVENTION

Figure 1:
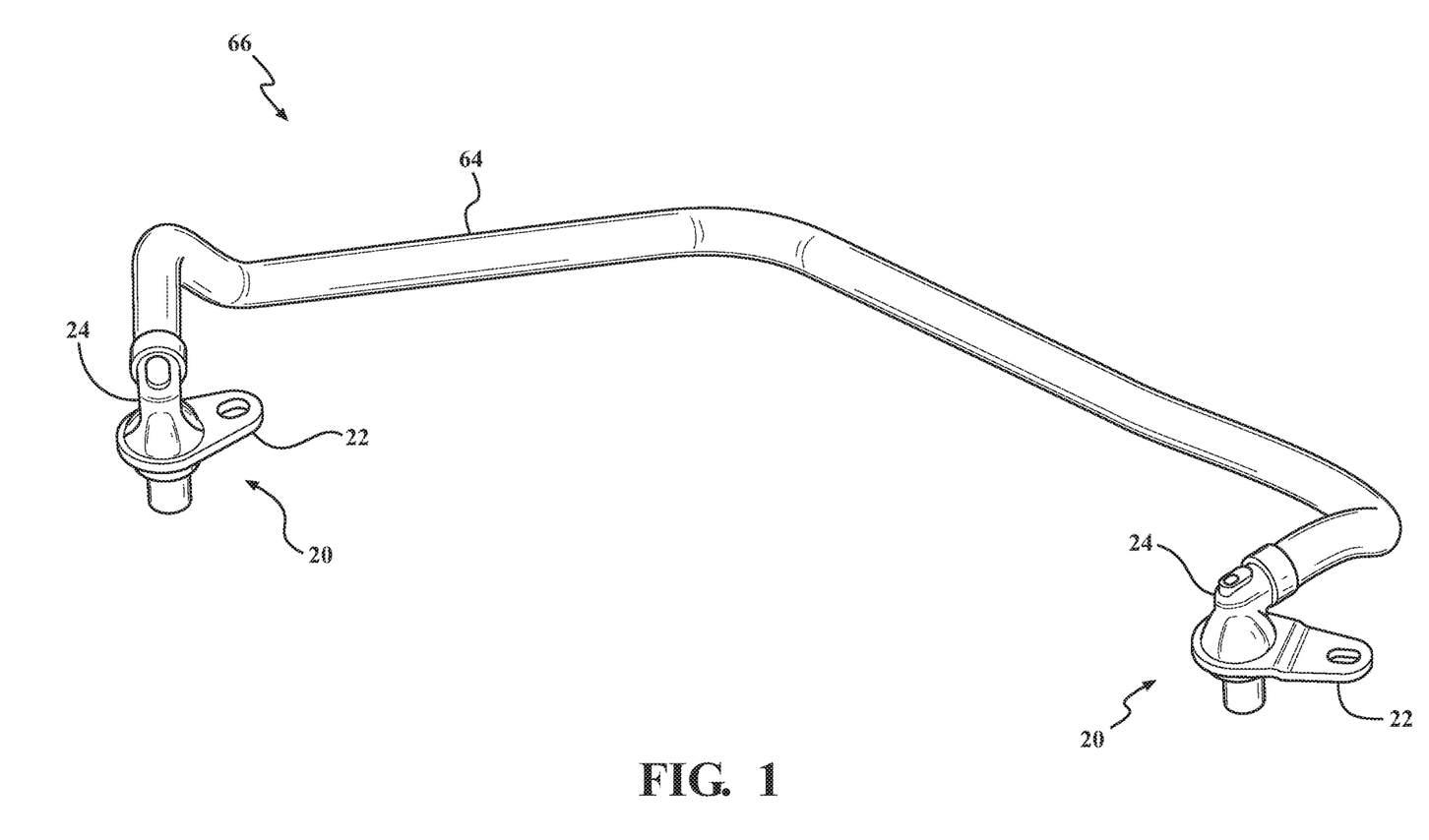
FIG. 1 is a perspective view of a fluid system showing two support assemblies.
Figure 2:
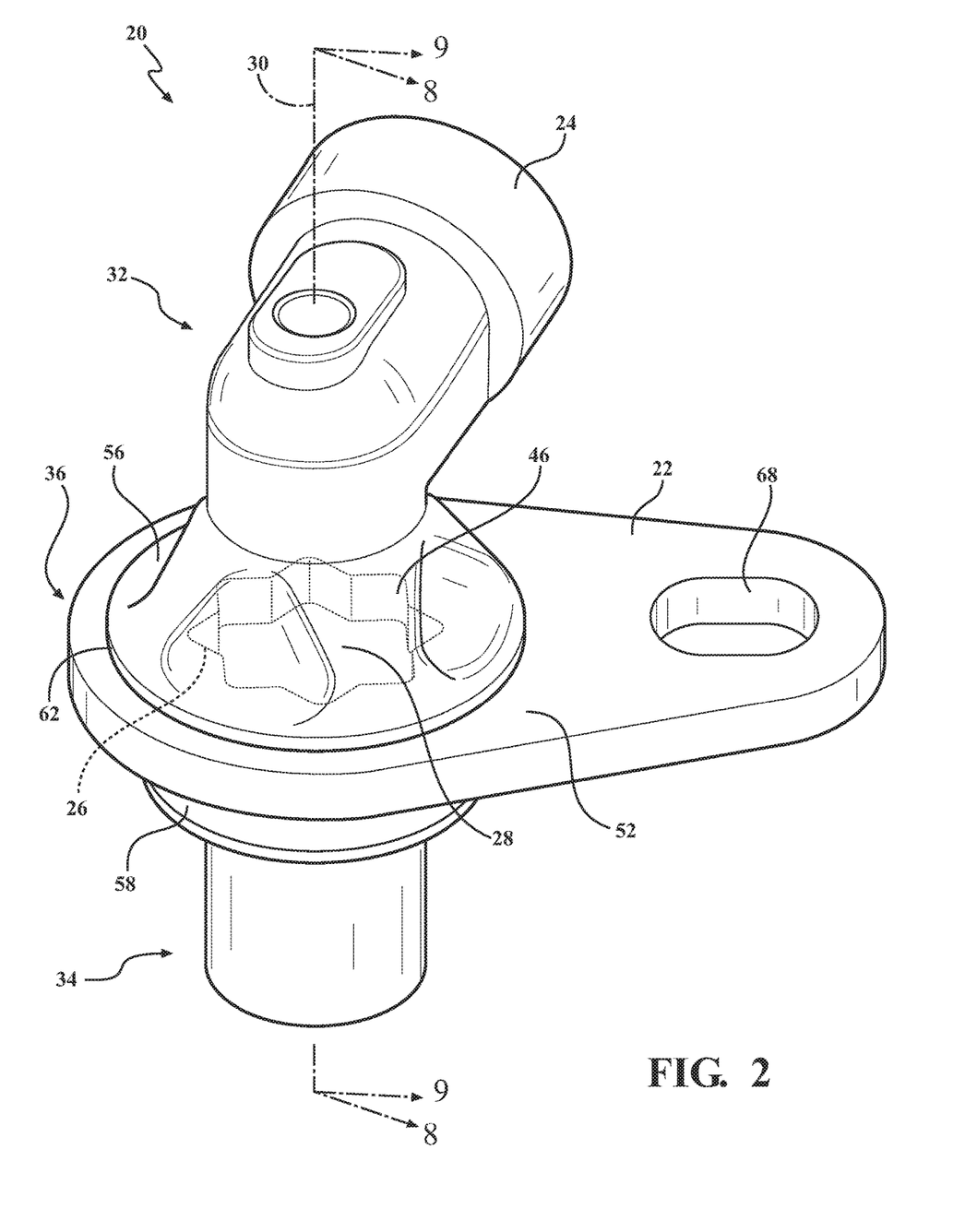
FIG. 2 is a perspective view of a support assembly including a mounting bracket and a coupling component with the mounting bracket presenting an engagement surface shown in phantom.

Referring to the Figures, wherein like numeral indicates like or corresponding parts throughout the several views, a fluid system 66 for a vehicle (not shown) is show in FIG. 1. The fluid system 66 comprises a hose 64 for transporting a fluid, a support assembly 20 coupled to the hose 64 and adapted to be coupled to the vehicle. The support assembly 20 comprises a mounting bracket 22 and a coupling component 24 coupled to the hose 64. The fluid system 66 is generally used in a vehicle, such as a passenger car or a truck; however, it is to be appreciated that the vehicle may be any configuration for providing transportation. Additionally, the fluid system 66 may be used in any industry where one or more hoses are required to be coupled.

As shown in FIGS. 2-5, the support assembly 20 comprises the mounting bracket 22. The mounting bracket 22 presents an engagement surface 26 defining a void 28 along a first axis 30. Additionally, the support assembly 20 comprises the coupling component 24 having a first end 32, a second end 34, and an intermediate portion 36. The intermediate portion 36 extends through and partially fills the void 28. The coupling component 24 defines a fluid passageway 38 about the first axis 30 within the void 28. The intermediate portion 36 of the coupling component 24 presents a locking surface 40, wherein the locking surface 40 abuts the engagement surface 26 to prevent rotation of the coupling component 24 with respect to the mounting bracket 22 and the hose 64.

The mounting bracket 22 is comprised of a first material. The first material is typically a metal which provides strength and rigidity needed to brace the support assembly 20. Preferably, the metal is plated steel. It is to be appreciated that the mounting bracket 22 could be made from any material provided it posses the required strength and rigidity for the application.

The coupling component 24 is comprised of a second material that is different from the first material. The second material is typically a polymer, preferably a composite material. The composite material of the coupling component 24 can withstand elevated temperatures and other stresses encountered where the support assembly 20 is employed. It is to be appreciated that the coupling component 24 could be made from any material that can be formed in an overmolding of the mounting bracket 22.

Figure 3:
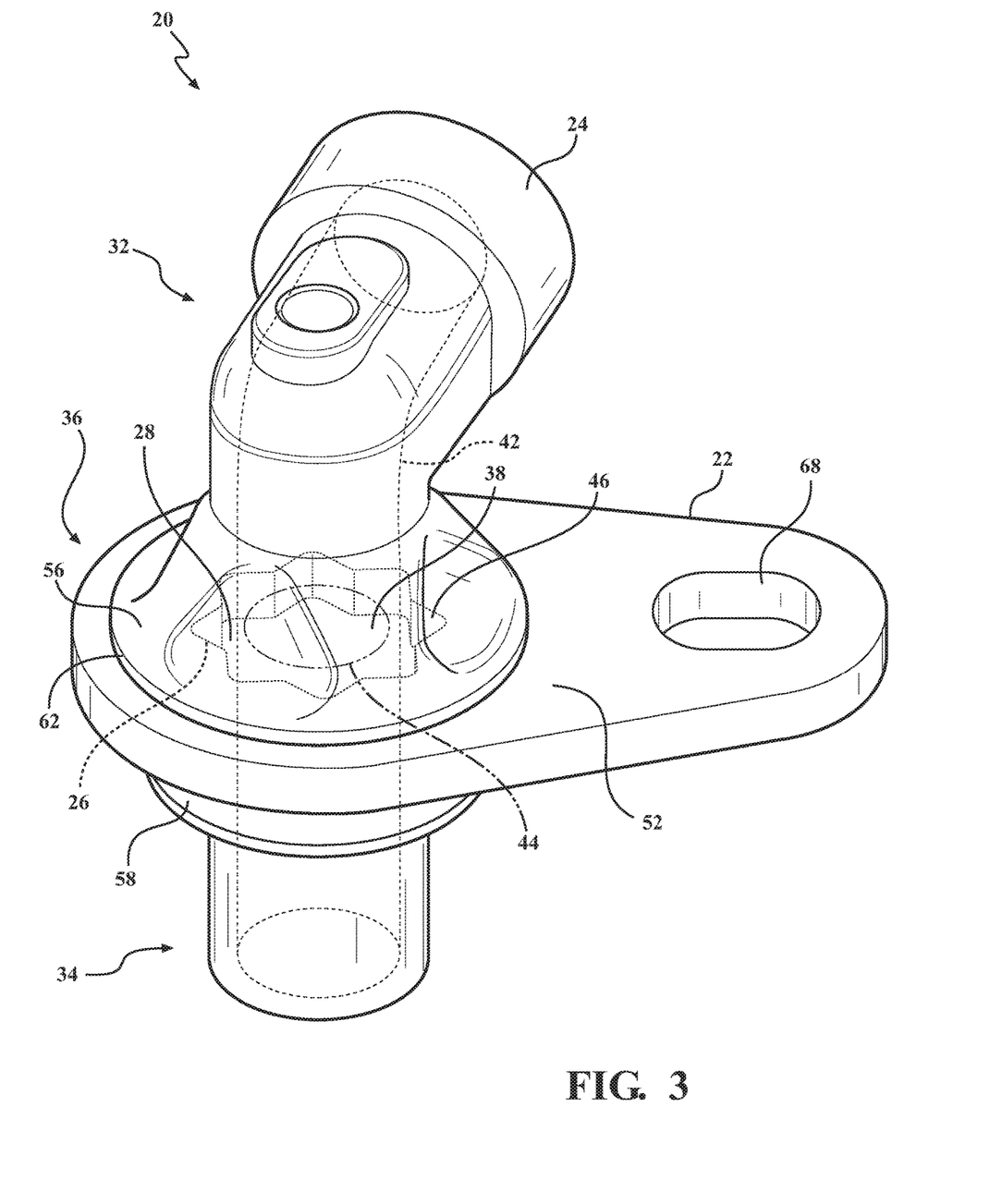
FIG. 3 is a perspective view of the support assembly and the coupling component defining a fluid passage shown in phantom.

The support assembly 20 contains a fluid passageway 38 extending from the first end 32 of the coupling component 24, through the intermediate portion 36, to the second end 34 of the coupling component 24, as shown in FIG. 3. The fluid passageway 38 extends through the void 28 in the mounting bracket 22. The intermediate portion 36 has an inner wall 42 facing the fluid passageway 38. Furthermore, the fluid passageway 38 allows sufficient space for the engagement surface 26 of the mounting bracket 22 to abut the locking surface 40 of the coupling component 24. The inner wall 42 of the fluid passageway 38 is a smooth surface. The smooth surface allows for fluid to flow in a laminar manner through the fluid passageway 38. Laminar flow is advantageous by allowing fluid to move quickly and efficiently through the fluid system 66.

The engagement surface 26 of the mounting bracket 22 has at least one groove 46. The groove 46 is filled by the second material 36 of the coupling component 24. The groove 46 is utilized to prevent rotation of the coupling component 24 with respect to the mounting bracket 22 by abutting and engaging the locking surface 40. The engagement surface 26 of the mounting bracket 22 may be a single groove or a plurality grooves. Additionally, the at least one groove 46 can have a polygonal shape, a curved shape, or a combination of polygonal and curved shapes. As shown in FIG. 12G, the engagement surface 26 is a combination of curved and polygonal shaped grooves, known as a keyhole configuration. It is to be appreciated that the at least one groove 46 may be any shape that prevents rotation of the coupling component 24 with respect to the mounting bracket 22.

The engagement surface 26 of the mounting bracket 22 may have a plurality of grooves 46 filled by the second material of the coupling component 24. The plurality of grooves 46 may be any shape that prevents rotation of the coupling component 24 and attached hose 64 with respect to the mounting bracket 22. Meaning the groove 46 or plurality of grooves 46 can have any combination of straight and/or curved configurations. Additionally, the collection of grooves 46 may be described as a polygonal cross-sectional profile, a curved cross-sectional profile, or a combination of polygonal and curved cross-sectional profiles, known simply as a cross-sectional profile.

Figure 12A:
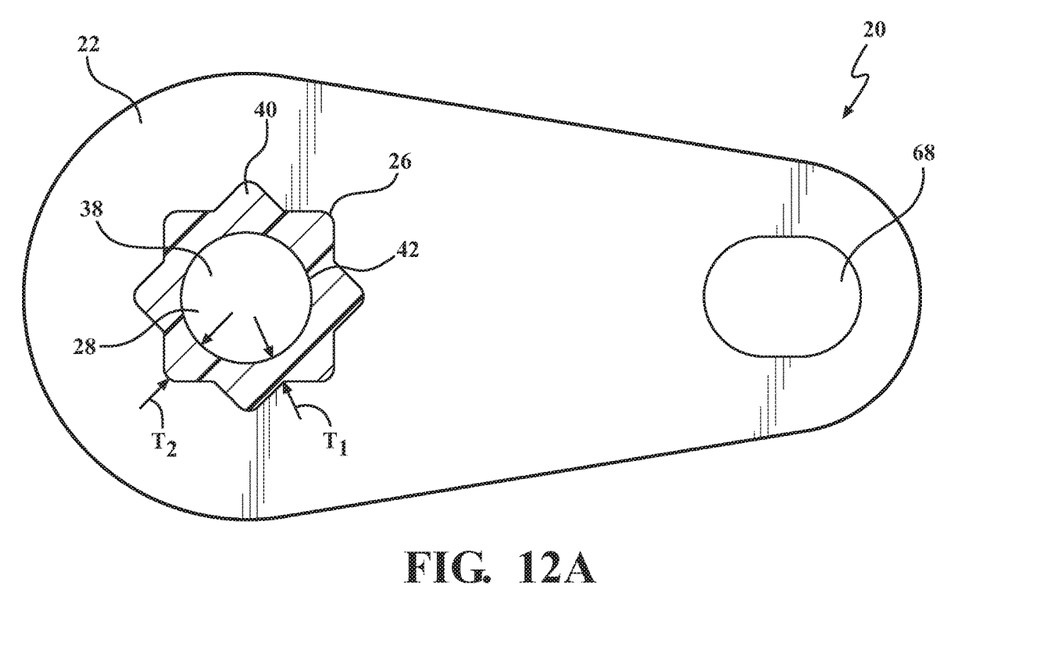
FIG. 12A is a top cross-sectional view of the support assembly taken along line 12-12 of FIG. 7.
Figure 12B:
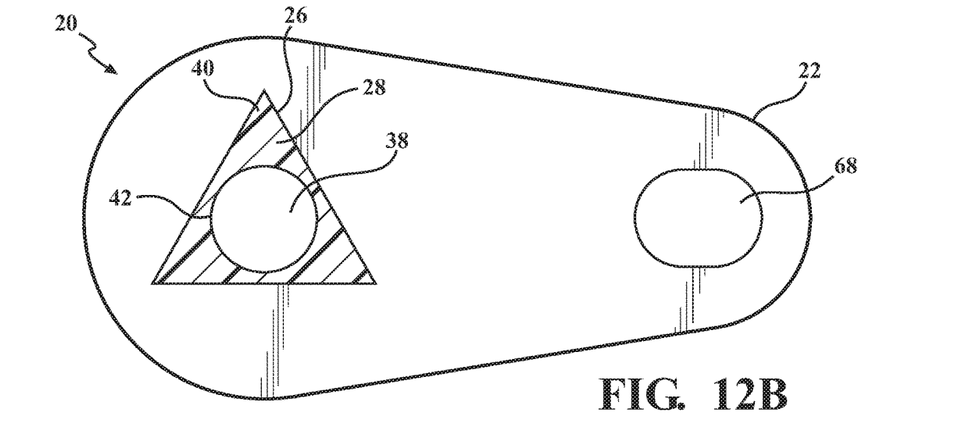
FIG. 12B is a top cross-sectional view of an alternative embodiment of a support assembly having a cross-sectional profile that is a triangular configuration.
Figure 12C:
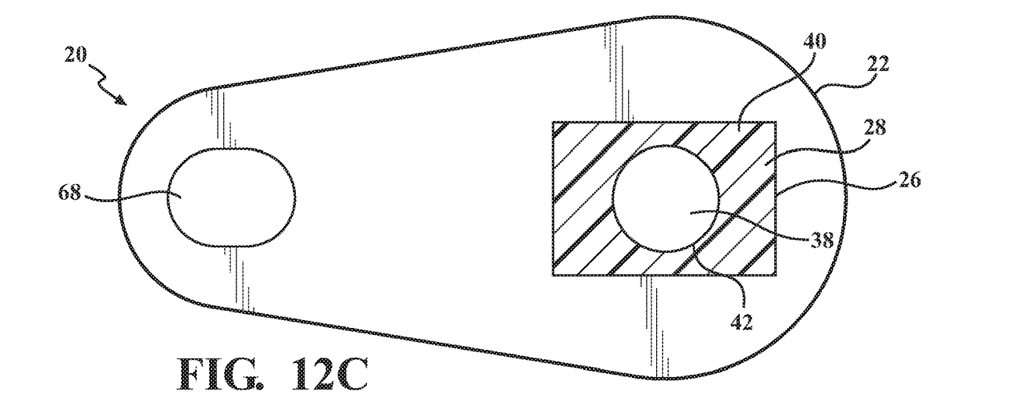
FIG. 12C is a top cross-sectional view of an alternative embodiment of a support assembly having a cross-sectional profile that is a rectangular configuration.

As shown in FIGS. 12A-12C, the groove or plurality grooves 46 of the engagement surface 26 collectively define a polygonal cross-sectional profile. The polygonal cross-sectional profile is selected from the group of a triangular configuration, a rectangular configuration, an isotoxal star configuration and combinations thereof. It is to be appreciated that the polygonal cross-sectional profile can be any shape or combination of shapes that collectively enclose the engagement surface 26.

As shown in FIG. 12A, the polygonal cross-sectional profile is an isotoxal star. It is to be appreciated that the polygonal cross-sectional profile can be any star polygon, can be any size, can have any number of sides, and the length of the sides do not have to be equal. Additionally, the polygonal cross-section has an inner diameter 44 defined by the fluid passageway 38. It is also to be appreciated that the inner diameter 44 can be any diameter suitable for the application of the support assembly 20.

As shown in FIG. 12B, the polygonal cross-sectional profile is a triangle. It is to be appreciated that the polygonal cross-sectional profile can be any triangle, any size, any orientation, and the length of the sides do not have to be equal. Additionally, the polygonal cross-section has an inner diameter 44 defined by the fluid passageway 38. It is also to be appreciated that the inner diameter 44 can be any diameter suitable for the application of the support assembly 20.

As shown in FIG. 12C, the polygonal cross-sectional profile is a rectangle. It is to be appreciated that the polygonal cross-sectional profile can be any rectangle, any size, and any orientation. Additionally, the polygonal cross-section has an inner diameter 44 defined by the fluid passageway 38. It is also to be appreciated that the inner diameter 44 can be any diameter suitable for the application of the support assembly 20.

Figure 12D:
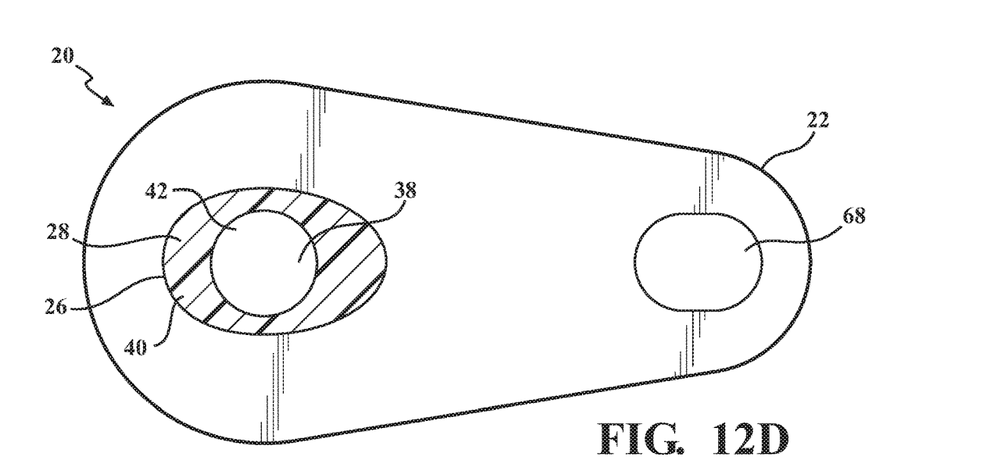
FIG. 12D is a top cross-sectional view of an alternative embodiment of a support assembly having a cross-sectional profile that is an oval configuration.
Figure 12E:
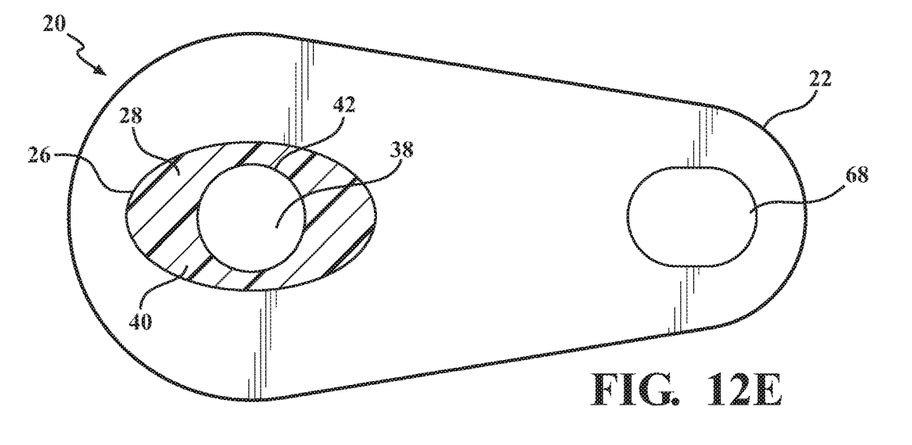
FIG. 12E is a top cross-sectional view of an alternative embodiment of a support assembly having a cross-sectional profile that is an ellipse configuration.
Figure 12F:
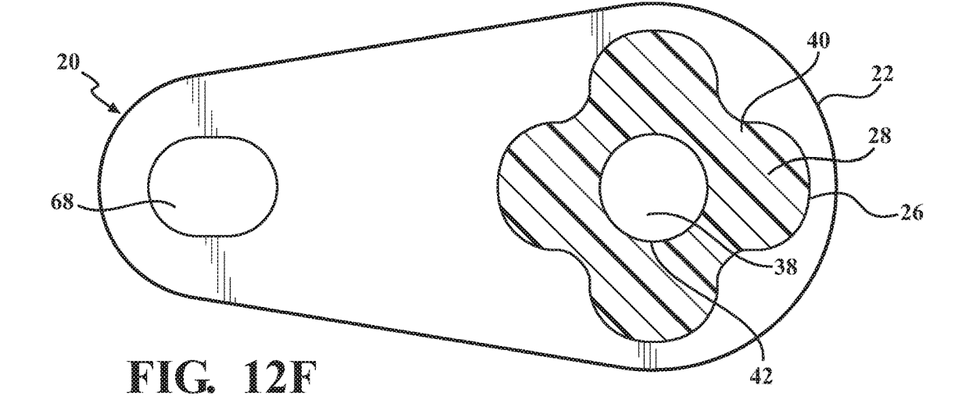
FIG. 12F is a top cross-sectional view of an alternative embodiment of a support assembly having a cross-sectional profile that is a curved groove configuration.
Figure 12G:
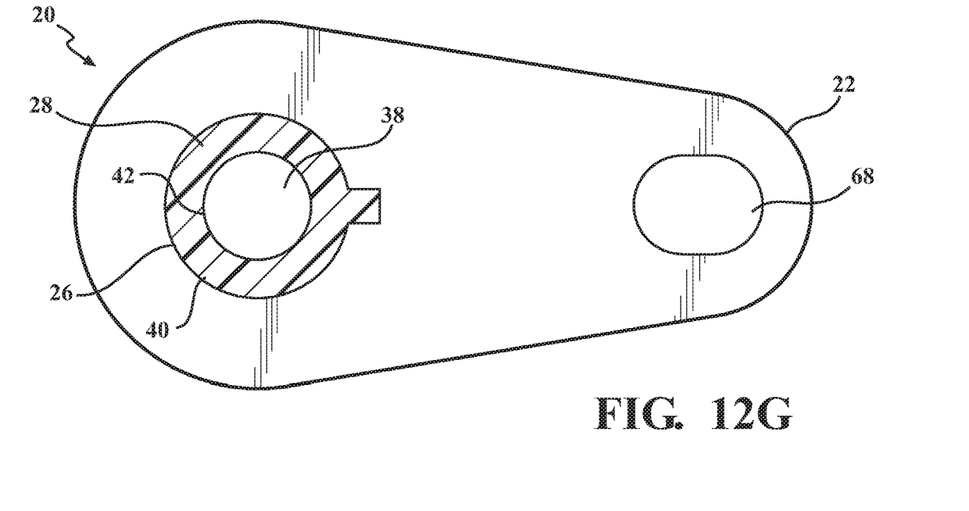
FIG. 12G is a top cross-sectional view of an alternative embodiment of a support assembly having a cross-sectional profile that is a keyhole configuration.

As shown in FIGS. 12D-12F, the engagement surface 26 is defined by a closed curve. The closed curve is filled by the second material of the coupling component 24. The closed curve collectively defines a cross-sectional profile selected from the group of an oval, an ellipse, a curved groove and combinations thereof. It is to be appreciated that the closed curve cross-sectional profile can be any configuration of curves that collectively enclose the engagement surface 26.

As shown in FIG. 12D, the closed curved cross-sectional profile is an oval. It is to be appreciated that the closed curved cross-sectional profile can be any oval, any size, and any orientation. Additionally, the closed curved cross-section has an inner diameter 44 defined by the fluid passageway 38. It is also to be appreciated that the inner diameter 44 can be any diameter suitable for the application of the support assembly 20.

As shown in FIG. 12E, the closed curved cross-sectional profile is an ellipse. It is to be appreciated that the closed curved cross-sectional profile can be any ellipse, any size, and any orientation. Additionally, the closed curved cross-section has an inner diameter 44 defined by the fluid passageway 38. It is also to be appreciated that the inner diameter 44 can be any diameter suitable for the application of the support assembly 20.

As shown in FIG. 12F, the closed curved cross-sectional profile is curved grooves 46. It is to be appreciated that the closed curved cross-sectional profile can be any combination of curved grooves, any number, any size, and any orientation. Additionally, the closed curved cross-section has an inner diameter 44 defined by the fluid passageway 38. It is also to be appreciated that the inner diameter 44 can be any diameter suitable for the application of the support assembly 20.

As shown in FIG. 12G, the cross-sectional profile is combination of a curve and a polygon. It is to be appreciated that the cross-sectional profile can be any shape or combination of shapes, any size, and any orientation. The cross-sectional profile shown in FIG. 12G is a keyhole. Additionally, the cross-section has an inner diameter 44 defined by the fluid passageway 38. It is also to be appreciated that the inner diameter 44 can be any diameter suitable for the application of the support assembly 20.

The grooves 46 of the engagement surface 26 are defined by the polygonal, curved, or combination thereof cross-sectional profile. The cross sectional profile contains an inner diameter 44 defined by the fluid passageway 38. The second material fills the grooves 46 defined by the cross-sectional profile and the fluid passageway 38. The filled grooves 46 abut the engagement surface 26 creating a locking surface 40. The abutment of the engagement surface 26 and the locking surface 40 prevent the rotation of the coupling component 24 and hose 64 with respect to the mounting bracket 22.

Figure 11:
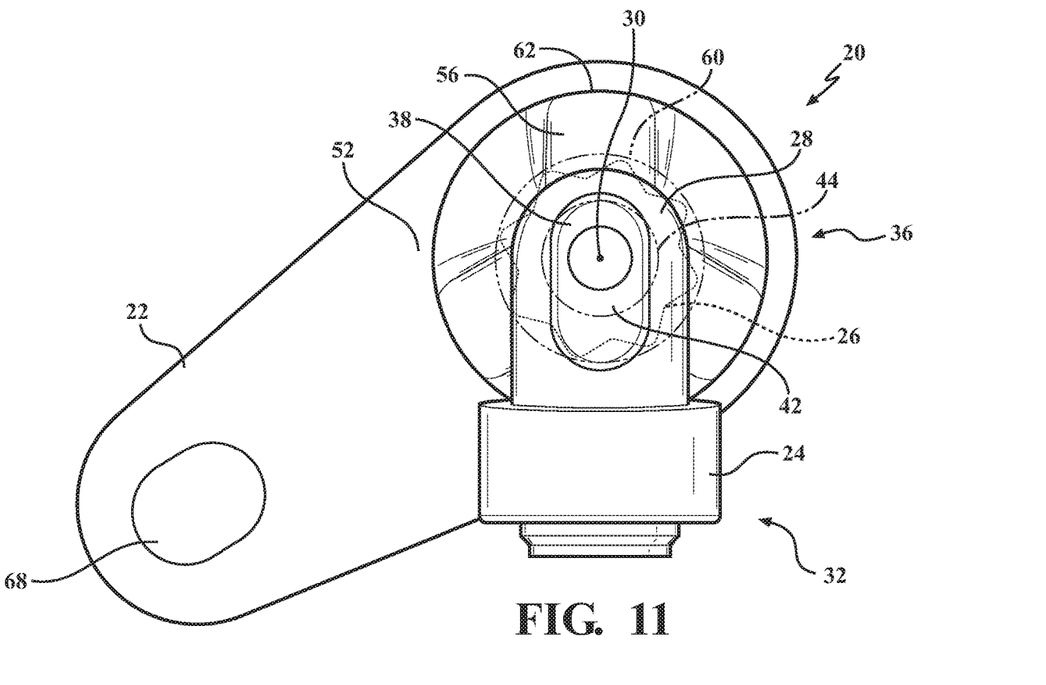
FIG. 11 is a top view of the support assembly shown in FIG. 2, with the engagement surface and the outer diameter of the engagement surface shown in phantom.

The first axis 30 is substantially perpendicular to the fluid passageway 38. The mounting bracket 22 has a first opposing surface 52 corresponding to the first end 32 of the coupling component 24. Similarly, the mounting bracket 22 has a second opposing surface 54 corresponding to the second end 34 of the coupling component 24. The intermediate portion 36 of the coupling component 24 has a first flange 56 and a second flange 58. The first and second flanges 56, 58 extend radially outward from the first axis 30, as shown in FIGS. 6-9. The void 28 in the mounting bracket 22 extends through the mounting bracket 22 and the engagement surface 26 and has an outer diameter 60. The first flange 56 engages the first opposing surface 52 of the mounting bracket 22 by extending further than the outer diameter 60 to partially enclose the void 28, and the engagement surface 26, as shown in FIG. 11. The second flange 58 engages the second opposing surface 54 of the mounting bracket 22 by extending further than the outer diameter 60 to partially enclose the void 28, and the engagement surface 26. The first and second flanges 56, 58 engage the first and second opposing surfaces, respectively, 52, 54, the void 28 and the engagement surface 26 are completely enclosed. Additionally, the first and second flanges 56, 58 have an outer diameter 62 greater than the outer diameter 60 of the engagement surface 26. This enclosing allows the fluid passageway 38 to extend from the first end 32 of the coupling component 24, through the intermediate portion 36, the void 28 and the engagement surface 26, further extending to the second end 34 of the coupling component 24 being completely sealed.

Figure 8:
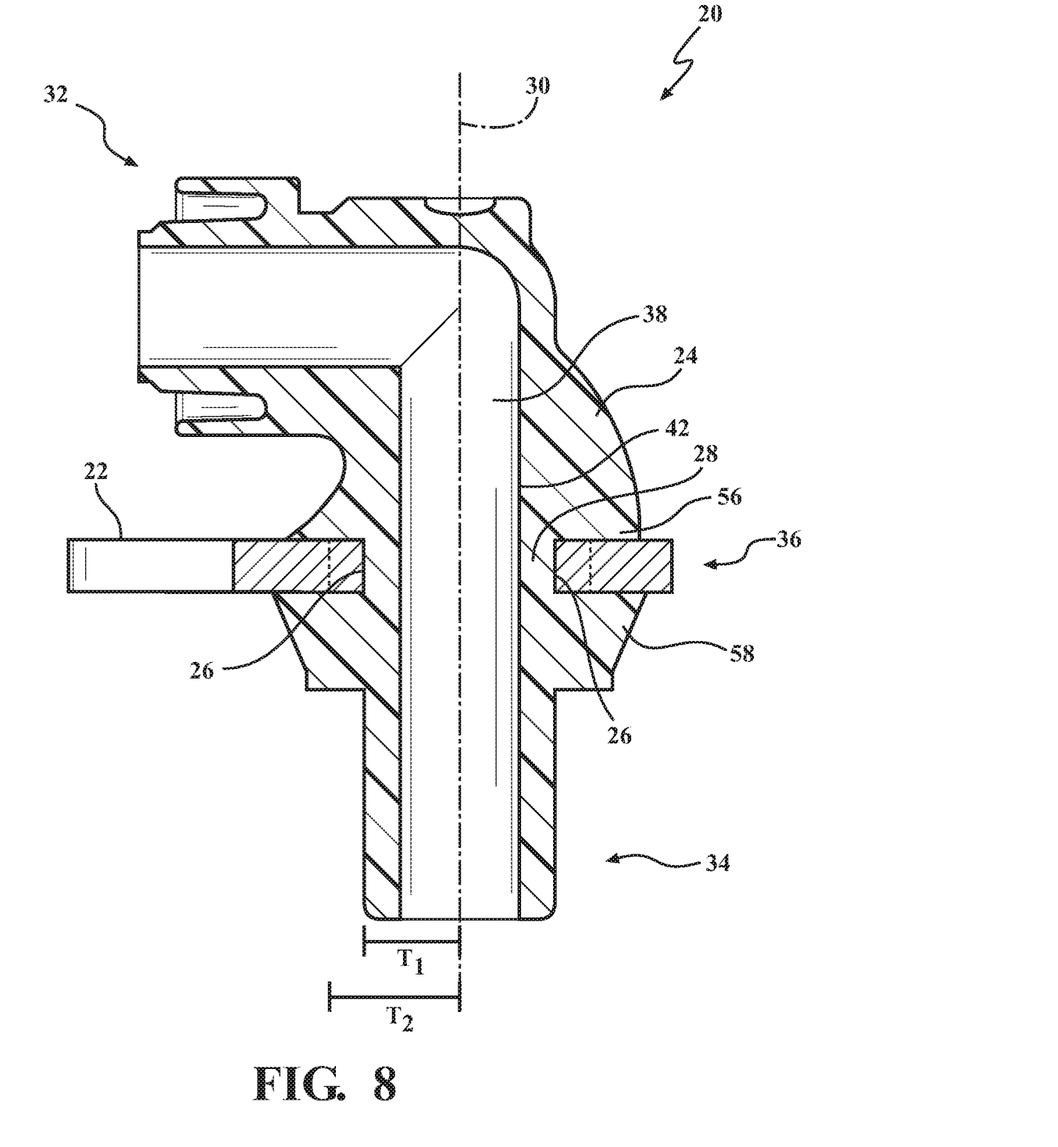
FIG. 8 is a cross-sectional view of the support assembly taken along line 8-8 of FIG. 2.

A cross-sectional view of the support assembly 20 with an isotoxal star cross-sectional profile is shown in FIG. 8. The support assembly 20 is oriented such that the distance between the fluid passageway 38 and the engagement surface 26 defined by the void 28 is the first thickness $T_1$. The first thickness $T_1$ is filled with the second material to secure the coupling component 24 to the mounting bracket 22 creating the locking surface 40. The abutting of the locking surface 40 and the engagement surface 26 prevents the coupling component 24 and hose 64 from rotating with respect to the mounting bracket 22.

Figure 9:
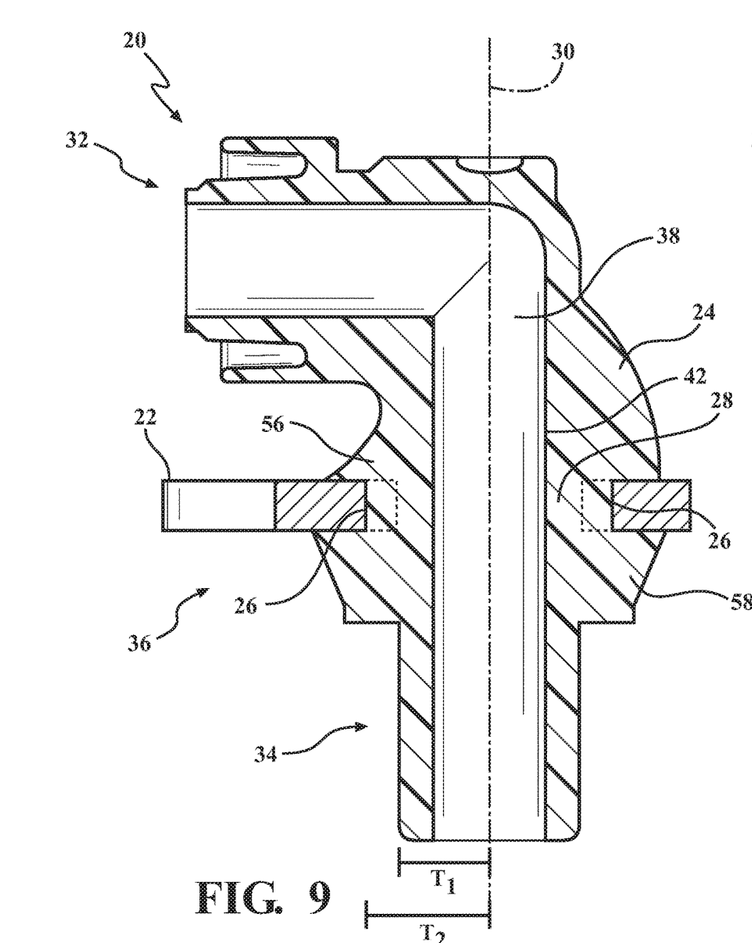
FIG. 9 is a cross-sectional view of the support assembly taken along line 9-9 of FIG. 2.

A cross-sectional view of the support assembly 20 with an isotoxal star cross-sectional profile is shown in FIG. 9. The support assembly is oriented such that the distance between the fluid passageway 38 and the engagement surface 26 defined by the void 28 is the second thickness $T_2$. The second thickness $T_2$ is filled with the second material to secure the coupling component 24 to the mounting bracket 22 creating the locking surface 40. The abutting of the locking surface 40 and the engagement surface 26 prevents the coupling component 24 and hose 64 from rotating with respect to the mounting bracket 22.

Figure 10:
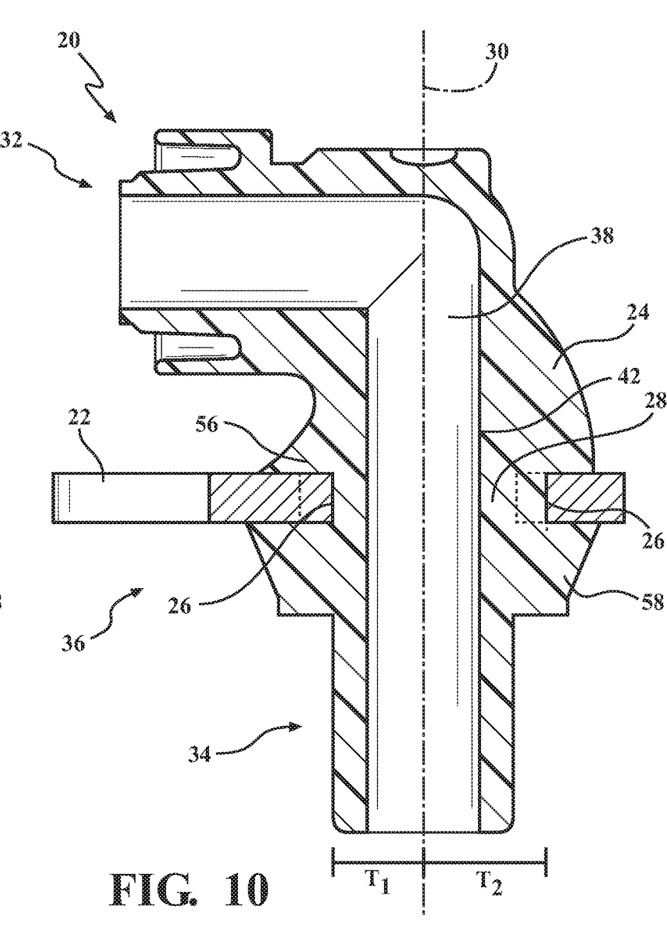
FIG. 10 is a cross-sectional view of an alternative embodiment of a support assembly having an alternate engagement surface.

An alternative embodiment of the support assembly 20 is shown in FIG. 10. The support assembly 20 has a cross-sectional profile selected from the polygonal, curved or combination thereof. Wherein the distance between the fluid passageway 38 and the engagement surface 26 is a first thickness $T_1$ on one side of the support assembly 20 and a second thickness $T_2$ on the opposing side of the support assembly 20. It is to be appreciated that the possible configurations of the cross-sectional profile could have many varying thicknesses between the fluid passageway 38 and the engagement surface 26.

The first and second flanges 56, 58 secure the coupling component 24 to the mounting bracket 22. The first flange 56 slopes in a direction from the first end 32 toward the mounting bracket 22 while simultaneously extending radially from the first axis 30. The second flange 58 also slopes in a direction from the second end 34 toward the mounting bracket 22 while simultaneously extending radially from the first axis 30. The flanges 56, 58 strengthen the support assembly 20 by bracing the coupling component 24 against the mounting bracket 22 and resisting any torsional force that may be experienced by the support assembly 20. It is to be appreciated, that the flanges may have a varying thickness proportional to the strength necessary for the application of the support assembly 20.

The fluid passageway 38 has the inner wall 42 defined by the inner diameter 44. The thickness of the intermediate portion 36 partially filling the void 28 and engaging the engagement surface 26 varies between a first thickness $T_1$ and a second thickness $T_2$. As shown in FIG. 11, the radius of the engagement surface 26 varies circumferentially about the first axis 30. The outer diameter 60 of the engagement surface 26 is substantially circular, the interaction of the engagement surface 26 and the outer diameter 60 creates varying thicknesses of the second material partially filling the void 28.

The varying thicknesses of the second material filling the space between the inner wall 42 of the fluid passageway 38 and the engagement surface 26 creates a connection between the mounting bracket 22 and the coupling component 24. The connection created must be a secure connection to overcome torsional forces exerted on the first and second ends 32, 34 of the coupling component 24.

As shown in FIGS. 2, 3, and 6-11 the support assembly 20 is illustrated with a female connection on the first end 32 and a male connection on the second end 34. It is to be appreciated that any connector may be on either end of the support assembly 20. Additionally, the support assembly 20 may have no connector at all.

Figure 4:
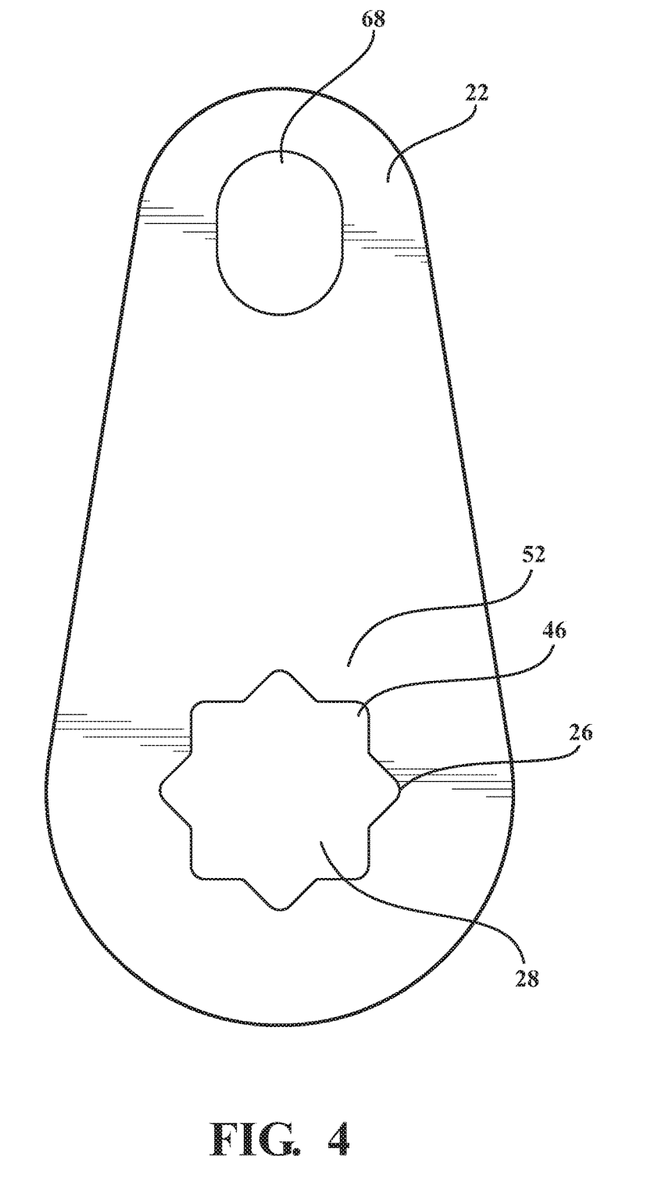
FIG. 4 is a top view of the mounting bracket.
Figure 5:
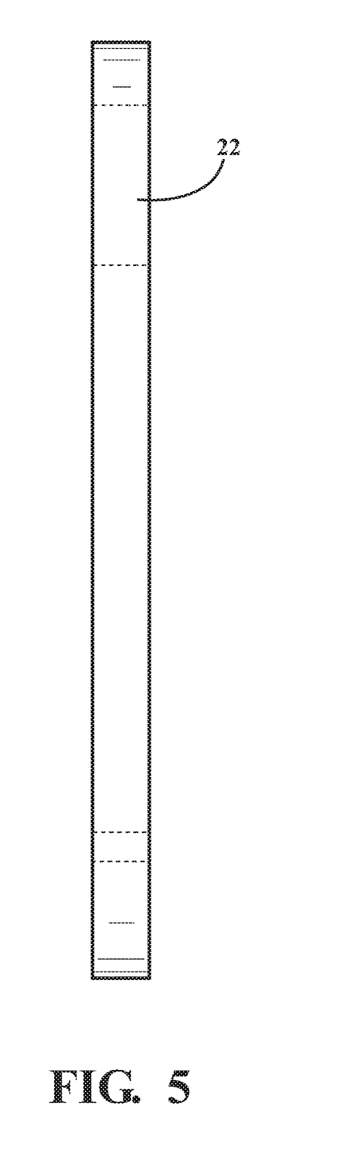
FIG. 5 is a side view of the mounting bracket.
Figure 6:
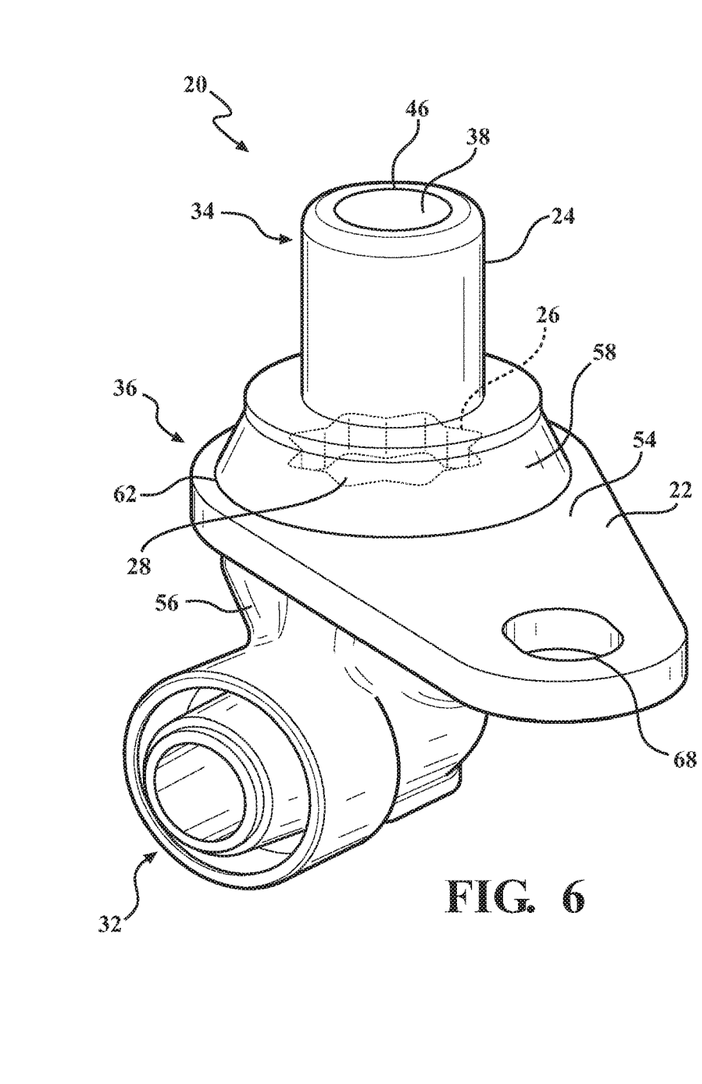
FIG. 6 is a perspective view of the support assembly showing the engagement of a second flange with a second opposing surface with the engagement surface shown in phantom.
Figure 7:
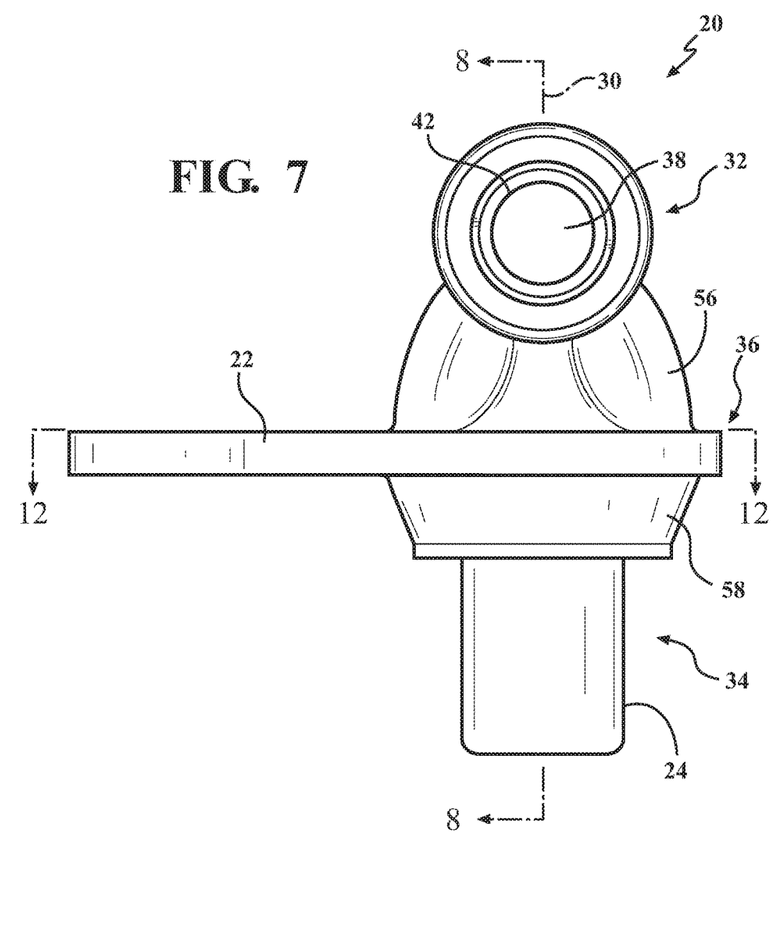
FIG. 7 is a side view of the support assembly.

Referring now to FIG. 4, the mounting bracket 22 includes a mounting feature 68. In the illustrated embodiments, the mounting feature 68 is shown as a mounting hole, however other mounting features are contemplated. It is to be appreciated that the mounting feature 68 can secure the support assembly 20 in many different fashions. For example, it could be a stud and nut configuration, a fir-tree connector configuration, a push-pin clip configuration, an expanding peg configuration, or a cable tie configuration. Additionally, the mounting bracket 22 could be sandwiched between the vehicle and another bracket to secure the support assembly 20 in place. The mounting feature 68 receives a fastener that secures the support assembly 20 to the vehicle.

For illustrative purposes the first end 32 of the coupling component 24 is shown as a connector at a ninety degree angle. It is to be appreciated that the connector can be at any angle or in any orientation suitable for the application.

A method of manufacturing the support assembly 20 comprises a step of forming the mounting bracket 22 and overmolding the coupling component 24 to the mounting bracket 22. The mounting bracket 22 has the engagement surface 26 defining the void 28. The coupling component 24 is formed with the first end 32, the second end 34, and the intermediate portion 36 with the intermediate portion 36 extending through and partially filling the void 28 to define the fluid passageway 38. The fluid passageway 38 is formed about the first axis 30 and through the void 28. The intermediate portion 36 is formed with the inner wall 42 facing the fluid passageway 38 and the locking surface 40 abutting the engagement surface 26 to prevent rotation of the coupling component 24 with respect to the mounting bracket 22.

The step of overmolding the coupling component 24 may further include a step of forming the intermediate portion 36 of the coupling component with the first flange 56 engaging the first surface 52 of the mounting bracket 22. Furthermore, forming the intermediate portion 36 with the second flange 58 engaging the second surface 54 of the mounting bracket 22. The engaging of both the first and second flanges 56, 58 with the first and second surfaces 52, 54 of the mounting bracket 22, respectively, affixes the coupling component 24 to the mounting bracket 22.

The step of overmolding the coupling component 24 may further include a step of forming the varying intermediate portion 36 having the first thickness $T_1$ and the second thickness $T_2$ between the fluid passageway 38 and the engagement surface 26.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A support assembly, said assembly comprising:
   a mounting bracket comprising a first material with said mounting bracket presenting an engagement surface defining a noncircular void along a first axis;
   a coupling component comprising a second material different from said first material with said coupling component having a first end, a second end, and an intermediate portion with said intermediate portion extending through and partially filling said void to define a fluid passageway about said first axis through said void with said intermediate portion having an inner wall facing said fluid passageway and a locking surface abutting said engagement surface to prevent rotation of said coupling component with respect to said mounting bracket;
   wherein said mounting bracket has first and second opposing surfaces and said intermediate portion has a first flange engaging said first surface and a second flange engaging said second surface to fully enclose said void; and
   wherein said mounting bracket extends radially from said first axis and includes a mounting feature for securing the support assembly to a vehicle.

2. The support assembly as set forth in claim 1, wherein said engagement surface defines at least one groove with said groove filled by said second material of said intermediate portion to prevent rotation of said coupling component with respect to said mounting bracket.

3. The support assembly as set forth in claim 1, wherein said engagement surface defines a plurality of grooves with said plurality of grooves filled by said second material of said intermediate portion to prevent rotation of said coupling component with respect to said mounting bracket.

4. The support assembly as set forth in claim 3, wherein said plurality of grooves of said engagement surface collectively define a polygonal cross-sectional profile.

5. The support assembly as set forth in claim 4, wherein said polygonal cross-sectional profile is selected from a triangular configuration, a rectangular configuration, an isotoxal star configuration, and combinations thereof.

6. The support assembly as set forth in claim 1, wherein said engagement surface defines a closed curve with said closed curve filled by said second material of said intermediate portion.

7. The support assembly as set forth in claim 6, wherein said closed curve defines a cross-sectional profile selected from an oval, an ellipse, a curved groove, and combinations thereof.

8. The support assembly as set forth in claim 1, wherein said engagement surface has an outer diameter and said first and second flanges each have outer diameters with said outer diameter of each of said first and second flanges being greater than said outer diameter of said engagement surface to fully enclose said void.

9. The support assembly as set forth in claim 1, wherein said inner wall defines an inner diameter of said fluid passageway and a thickness of said intermediate portion between said inner wall and said engagement surface varies between a first thickness and a second thickness.

10. The support assembly as set forth in claim 1, wherein said first end has a female connection.

11. The support assembly as set forth in claim 1, wherein said first material is a metal.

12. The support assembly as set forth in claim 1, wherein said second material is a polymer.

13. The support assembly as set forth in claim 1, wherein said coupling component is overmolded on said mounting bracket.

14. A fluid system for a vehicle comprising:
    a hose for transporting a fluid; and
    a support assembly coupled to said hose and adapted to be coupled to the vehicle, said support assembly comprising:

a mounting bracket adapted to be secured in the vehicle, said mounting bracket comprising a first material with said mounting bracket presenting an engagement surface defining a noncircular void along a first axis; and a coupling component comprising a second material different from said first material with said coupling component having a first end, a second end, and an intermediate portion with said first end being coupled to said hose and said intermediate portion extending through and partially filling said void to define a fluid passageway about said first axis through said void with said intermediate portion having an inner wall facing said fluid passageway and a locking surface abutting said engagement surface to prevent rotation of said coupling component with respect to said mounting bracket;

wherein said mounting bracket has first and second opposing surfaces and said intermediate portion has a first flange engaging said first surface and a second flange engaging said second surface to fully enclose said void; and wherein said mounting bracket extends radially from said first axis and includes a mounting feature for securing the support assembly to a vehicle.

15. The fluid system as set forth in claim 14, wherein said engagement surface defines at least one groove with said groove filled by said second material of said intermediate portion to prevent rotation of said coupling component with respect to said mounting bracket and said hose.

16. The fluid system as set forth in claim 14, wherein said engagement surface defines a closed curve with said closed curve filled by said second material of said intermediate portion to prevent rotation of said coupling component with respect to said mounting bracket and said hose.

17. The fluid system as set forth in claim 14, wherein said inner wall defines an inner diameter of said fluid passageway with an inner diameter of said hose being substantially similar to said inner diameter of said fluid passageway, and a thickness of said intermediate portion between said inner wall and said engagement surface varying between a first thickness and a second thickness.

\* \* \* \* \*